United States Patent [19]

Lewis et al.

[11] 4,388,178

[45] Jun. 14, 1983

[54] CATALYTIC CRACKING PROCESS

[75] Inventors: Paul H. Lewis; Joseph A. Durkin, both of Groves; Joseph A. Froelich, Nederland, all of Tex.

[73] Assignee: Texaco Inc., White Plains, N.Y.

[21] Appl. No.: 334,413

[22] Filed: Dec. 24, 1981

Related U.S. Application Data

[63] Continuation-in-part of Ser. No. 198,859, Oct. 20, 1980, Pat. No. 4,324,698.

[51] Int. Cl.³ .................... C10G 11/05; C10G 11/08; C10G 11/18; B01J 29/12
[52] U.S. Cl. .................... 208/115; 208/135
[58] Field of Search ............... 208/120, 115, 116, 117

[56] References Cited

U.S. PATENT DOCUMENTS

| | | | |
|---|---|---|---|
| 2,336,165 | 12/1943 | Connolly | 208/115 |
| 2,483,131 | 9/1949 | Garrison | 252/441 |
| 2,694,674 | 11/1954 | Starr et al. | 208/115 |
| 2,848,380 | 8/1958 | Thomas | 208/66 |
| 3,137,656 | 6/1964 | Mason et al. | 252/441 X |
| 3,702,312 | 11/1972 | Wilson | 252/442 |
| 3,986,946 | 10/1976 | Baker | 208/115 |
| 4,073,865 | 2/1978 | Flanigen et al. | 423/339 |
| 4,324,697 | 4/1982 | Lewis et al. | 208/115 X |
| 4,324,698 | 4/1982 | Lewis et al. | 208/115 X |

*Primary Examiner*—Delbert E. Gantz
*Assistant Examiner*—G. E. Schmitkons
*Attorney, Agent, or Firm*—Carl G. Ries; Robert A. Kulason; Robert Knox

[57] ABSTRACT

An improved process for fluid catalytic cracking or hydrocarbons employing a Y zeolite in a silica-alumina matrix and containing from about 0.1 to about 5 weight percent fluorine. The catalyst is prepared by contacting a Y zeolite in a silica-alumina matrix with an aqueous solution of a fluorine compound, preferably an aqueous solution of hydrogen fluoride, for a period of 16 to 24 hours, followed by drying and calcining the resultant fluorided cracking catalyst. The process of cracking hydrocarbons with these catalysts produces improved yields of motor fuel fractions of improved octane number as compared with processes employing unfluorided cracking catalysts.

3 Claims, No Drawings

CATALYTIC CRACKING PROCESS

This application is a continuation-in-part of our U.S. patent application Ser. No. 198,859 (now U.S. Pat. No. 4,324,698), filed Oct. 20, 1980.

This invention relates to an improved catalytic cracking process. In one of its more particular aspects, this invention relates to a method for catalytic cracking of petroleum hydrocarbons in the presence of a fluorided zeolite cracking catalyst.

In the process of this invention, hydrocarbon cracking feedstocks are subjected to catalytic cracking in the presence of an improved catalyst comprising a composite of a Y zeolite in a silica-alumina matrix, said composite containing 0.1 to 5 weight percent fluorine. In a preferred method of preparation of the catalyst a conventional zeolite cracking catalyst comprising a Y zeolite in a silica-alumina matrix is fluorided in a novel manner which improves the catalytic activity of the zeolite cracking catalyst.

It is known in the art that the catalytic activity of solid contact catalysts of the amorphous type may be enhanced by incorporating into the catalyst acid activators, such as fluorine. Amorphous-type catalysts, for example, alumina and silica-alumina catalysts, exhibit enhanced cracking activity when treated with various fluorine compounds under anhydrous or aqueous conditions. For example, U.S. Pat. Nos. 2,336,165 (Connolly), 2,483,131 (Garrison); 2,694,674 (Starr et al); and 2,848,380 (Thomas) all describe the preparation of improved alumina and silica-alumina cracking catalysts by treatment with various fluorine compounds.

More recent patents relate to the methods for fluoriding zeolite-containing catalysts. U.S. Pat. No. 3,137,656 (Mason et al) describes a method for haliding a hydrocracking catalyst which may comprise crystalline alumino-silicates by treatment with an hydrous halide. The resulting catalyst has enhanced hydrocracking activity but must be used in a carefully controlled anhydrous atmosphere to prevent stripping off of the loosely held halide. U.S. Pat. No. 3,702,312 (Wilson) describes a method for incorporating fluorine into the crystal lattice of an alumino-silicate by a sequence of steps involving ion exchange. This patent demonstrates (Example I) that conventional impregnation techniques useful for fluoriding amorphous catalysts are not suitable for treatment of zeolites.

We have now found that the conversion of hydrocarbon cracking feedstocks to motor fuel components may be increased and at the same time both naphtha yields and octane number of the naphtha fraction increased by catalytic cracking at a temperature in the range of 900° F. by incorporating 0.1 to 5 weight percent fluorine into a composite of Y zeolite in a silica-alumina matrix.

The present invention related to an improved process for cracking petroleum hydrocarbons by contacting a suitable cracking stock with a catalyst comprising a composite of a Y zeolite in a silica-alumina matrix in which the composite is fluorided by treatment with an aqueous solution of a fluorine compound. The process of this invention results in improved yields of products, of higher octane value than those obtained with unfluorided zeolite cracking catalysts.

The preferred cracking catalyst employed in the process of this invention comprises a zeolite in a silica-alumina matrix, containing from about 0.1 to about 5 percent by weight of fluorine. The catalyst may be prepared in accordance with our invention by admixing a solid dry zeolite-containing cracking catalyst with an aqueous solution of a fluorine compound in an amount sufficient for incipient wetness of the solid at a temperature of about 32° F. and permitting the mixture to stand for a period of 16 to 24 hours, followed by drying and then calcining the resulting fluorided catalyst.

The zeolite cracking catalyst which may be used in the practice of this invention may be a faujasite or a synthetic Y zeolite in a silica-alumina matrix. The precise form in which fluorine is combined with the zeolite-containing cracking catalyst is not entirely known. It is customary in the art to refer to the fluorine as combined with alumina or silica-alumina in the form of fluoride. The process of the present invention is not limited to the use of catalysts in which the fluorine is present in the catalyst as fluoride, but may include other forms of fluorine incorporated into the zeolite-containing catalyst when prepared as described herein.

Hydrogen fluoride is the preferred fluoriding agent for preparation of catalysts employed in the process of this invention although other fluorine compounds, such as ammonium fluoride, ammonium bifluoride, boron trifluoride, ammonium fluoborate, and ammonium fluosilicate are also suitable. Fluoriding of the zeolite-containing cracking catalyst is accomplished by an incipient wetness impregnation technique carried out at a temperature of about 32° F. for a period of about 3 to 4 hours.

Following the fluoriding step, the zeolite-containing cracking catalyst contains from about 0.1 to about 5 percent by weight of fluoride, preferably, about 1 percent by weight. The fluorided catalyst is then dried at a temperature of about 200° F. to about 600° F., preferably at about 300° F., for about 2 to about 24 hours. Finally, the fluorided catalyst is calcined for about 0.5 to about 10 hours at a temperature of about 700° F. to about 1100° F., preferably at about 1000° F.

The catalyst of this invention is particularly useful in the well known fluidized catalytic cracking processes. In the fluidized catalytic cracking process, hydrocarbon oil feedstock is contacted with the catalyst in a reaction zone under conditions such that the contact time between the hydrocarbon feedstock and the catalyst and the cracking reaction temperatures are carefully controlled. Suitable catalytic reactors may comprise a transport type reaction zone through which vaporized hydrocarbon and a solid particulate catalyst suspended in the hydrocarbon vapors are passed concurrently. The reaction products and catalyst are discharged from the transport type reaction zone into a separation zone in which hydrocarbons are separated from the catalyst. Coke deposited on the catalyst during its passage through the reaction zone is removed from the catalyst in a separate regeneration zone where the catalyst is regenerated by burning the coke with air. The resulting hot regenerated catalyst from the regeneration zone is recycled to the reaction zone into contact with additional hydrocarbon feedstock. The conditions under which the improved cracking catalyst may be used are those customarily used in the art for cracking reactions. Thus, temperatures in the range of from about 850° F. to about 950° F. and pressures of about 10 to about 25 psig are ordinarily used.

The following example illustrates the advantages of utilizing the catalyst of this invention in catalytic cracking operations.

EXAMPLE

A commercial cracking catalyst, Davison CBZ-1, was used to demonstrate the process of this invention. This catalyst, which comprises a Y zeolite in a silica-alumina matrix was a sample of equilibrium catalyst from a commercial cracking operation. Examination of the equilibrium catalyst indicated the following physical characteristics: surface area=98 $m^2$/gm, pore volume=0.36 cc/gm; density (loose)=0.76 g/cc; alumina=38.1 wt.%, average particle size=55 microns.

A portion of the equilibrium catalyst was fluorided by an incipient wetness impregnation technique. Aqueous hydrogen fluoride solution was prepared by diluting 4 grams of concentrated HF acid with 136 ml of distilled water. 70 ml of the HF solution was added to 100 grams of the catalyst in an ice bath with mixing in order to distribute the solution on the catalyst. The nominal loading of the fluoride was 1 percent by weight. The catalyst mixture was kept near 32° F. for a period of 3 to 4 hours in the ice bath and then allowed to gradually warm to room temperature. After a total contact time of 16 to 24 hours, moisture was removed by drying the catalyst at 300° F. Finally, the fluorided catalyst was calcined at 1000° F. for 2 hours.

In Examples 1 and 2, comparisons were made between the cracking activities of the fluorided and unfluorided portions of the zeolite cracking catalyst at 900° F.

Tests were conducted in a pulsed feed, fixed bed microreactor unit designed to evaluate cracking catalysts. The tests were conducted with a hydrocarbon charge stock having the properties shown in Table I.

TABLE I

| | |
|---|---|
| Gravity, °API | 36.7 |
| Viscosity at 100° F., SUS | 4.3 |
| Viscosity at 210° F., SUS | 1.5 |
| Pour Point, °F., | 20 |
| Sulfur, wt. % | 0.08 |
| Conradson Carbon Residue, wt. % | None |
| Bromine No. | 3 |
| ASTM Distillation (D-2887) | °F. |
| Initial Boiling Point | 318 |
| 5% | 435 |
| 10% | 465 |
| 20% | 498 |
| 30% | 522 |
| 40% | 543 |
| 50% | 566 |
| 60% | 586 |
| 70% | 610 |
| 80% | 645 |
| 90% | 692 |
| 95% | 735 |
| End Point | 856 |

In each of the test runs, 4 grams of catalyst were contacted with 1.3 grams of the test feed during a 75 second pulse. The catalyst to oil weight ratio was 3 and the Weight Hourly Space Velocity (WHSV) was 16.

The liquid products from the test runs were collected in a receiver cooled in an ice-water bath. The products were analyzed on a chromatograph. Conversion, naphtha yields and yields of light cycle oil (LCO) were determined by ASTM Method D-2887-73. Conversion was calculated as the difference between the amount of feed charged and the amount of material in the product. The naphtha fraction was the liquid product fraction having a boiling point range up to 421° F. The light cycle oil is the product having a boiling point range of 421° F. to 670° F.

Research Octane Numbers (RON) were calculated by analyzing the naphtha fraction into specific groups and assigning an octane factor to each group. The octane numbers of the products are based upon the amount of each specific group in the product and the octane factor assigned to each group. See. P. C. Anderson, J. M. Sharkey, and R. P. Walsh, *J. Inst. Pet.*, 58, 83 (1972).

The results of the test runs are summarized in Table II.

TABLE II

| Example | 1 | 2 |
|---|---|---|
| Catalyst | Unfluorided | Fluorided |
| No. of Tests | 9 | 4 |
| RON, Calculated | 89.2 | 90.5 |
| Conversion, wt. % | 61.4 | 67.7 |
| Naphtha, wt. % | 38.0 | 39.4 |
| LCO, wt. % | 25.3 | 20.2 |
| Aromatics, wt. % | 5.7(15.1%)* | 6.5(16.6%)* |
| Olefins, wt. % | 9.6(25.3%)* | 10.4(26.5%)* |
| Carbon, wt. % | 8.3 | 6.7 |

*Numbers in parenthesis represent the percent aromatics and olefins in the naphtha fraction of the liquid product.

The examples show that at 900° F., fluoriding of the zeolite-containing cracking catalyst produced an increase of 1.3 percent in octane number (Research Method), a 6.3 percent increase in conversion, and a 1.4 percent increase in naphtha yield relative to the untreated catalyst. The fluorided catalyst also produced more aromatics and olefins, and produced less light cycle oil and carbon than the untreated sample.

We claim:

1. In a process wherein a petroleum hydrocarbon feedstock is contacted with a zeolite cracking catalyst under hydrocarbon cracking conditions including a temperature in the range of 850° to 950° F., the improvement which comprises contacting said hydrocarbon with a catalyst consisting of at least 90 percent by weight of a composite of a Y-zeolite in a silica-alumina matrix, said composite containing from about 0.1 to about 5 percent by weight fluorine.

2. A process according to claim 1 wherein said fluorine is incorporated in said composite by contacting said commposite with an aqueous solution of fluorine compound in an amount just sufficient to produce incipient wetness of said composite for a total period of 16 to 24 hours and thereafter drying and calcining the resulting fluorided composite.

3. A process according to claim 2 wherein the initial contact between the composite and the aqueous solution is carried out at a temperature of about 32° F. for a period of about 3 to 4 hours.

* * * * *